(12) United States Patent
Zanotti et al.

(10) Patent No.: US 7,685,997 B2
(45) Date of Patent: Mar. 30, 2010

(54) CONTROL METHOD OF A FUEL FEEDING SYSTEM IN A BI-FUEL INTERNAL COMBUSTION ENGINE

(75) Inventors: Massimo Zanotti, Vado (IT); Loris Lambertini, Crespellano (IT)

(73) Assignee: Magneti Marelli Powertrain S.p.A., Corbetta (IT)

( * ) Notice: Subject to any disclaimer, the term of this patent is extended or adjusted under 35 U.S.C. 154(b) by 0 days.

(21) Appl. No.: 12/132,255

(22) Filed: Jun. 3, 2008

(65) Prior Publication Data
US 2008/0302338 A1      Dec. 11, 2008

(30) Foreign Application Priority Data
Jun. 4, 2007     (EP) .................................. 07425347

(51) Int. Cl.
*F02B 7/00*       (2006.01)
*F02M 51/00*   (2006.01)

(52) U.S. Cl. ....................... 123/478; 123/431

(58) Field of Classification Search ................ 123/431, 123/478, 575
See application file for complete search history.

(56) References Cited

U.S. PATENT DOCUMENTS

| | | | |
|---|---|---|---|
| 5,735,253 A * | 4/1998 | Perotto et al. .......... | 123/406.47 |
| 6,321,694 B1 * | 11/2001 | Vergine et al. .......... | 123/27 GE |
| 6,687,597 B2 * | 2/2004 | Sulatisky et al. ............ | 701/104 |
| 6,951,210 B2 * | 10/2005 | Landi et al. .................. | 123/525 |
| 6,988,492 B2 * | 1/2006 | Shetley ........................ | 123/525 |
| 7,045,916 B2 * | 5/2006 | Stolt et al. .................... | 307/116 |
| 2006/0207564 A1 * | 9/2006 | Kinose ........................ | 123/431 |
| 2007/0175459 A1 * | 8/2007 | Williams et al. ............. | 123/575 |
| 2009/0024301 A1 * | 1/2009 | Volpato ...................... | 701/103 |

FOREIGN PATENT DOCUMENTS

| | | |
|---|---|---|
| EP | 07 42 5347 A | 6/1996 |
| EP | 1 310 654 A | 5/2003 |
| EP | 1 669 578 A | 6/2006 |
| WO | WO 2004/097196 A | 11/2004 |

* cited by examiner

*Primary Examiner*—Hai H Huynh
(74) *Attorney, Agent, or Firm*—FSP LLC

(57) ABSTRACT

A control method of a fuel feeding system in a bi-fuel internal combustion engine; the feeding system presents: a least a first injector adapted to inject a first fuel type; a least a second injector adapted to inject a second fuel type; a common electronic control unit adapted to drive both injectors; and a switching device, which is controlled by the common electronic control unit and is adapted to electrically connect both injectors to the common electronic control unit by means of at least a first relay adapted to connect/disconnect the first injector to/from the common electronic control unit and by means of at least a second relay adapted to connect/disconnect the second injector to/from the common electronic control unit.

10 Claims, 3 Drawing Sheets

CONTROL METHOD OF A FUEL FEEDING SYSTEM IN A BI-FUEL INTERNAL COMBUSTION ENGINE

PRIORITY CLAIM

This application claims priority under 35 USC 119 AND/OR 365 to EUROPE application No. 07425347.7 filed on Monday, Jun. 4, 2007.

TECHNICAL FIELD

The present invention relates to a control method of a fuel feeding system in a bi-fuel internal combustion engine.

BACKGROUND ART

A bi-fuel internal combustion engine is capable of indifferently running on two different types of fuel (typically gasoline and LPG or gasoline and methane). A modern bi-fuel internal combustion thermal engine uses two different types of injectors, each of which is capable of injecting a corresponding fuel type.

Two separate electronic control units, each of which independently controls the other with a corresponding group of injectors, are always used for after-market adaptations of the thermal engine; however, such solution is costly because it requires the installation of two separate and independent electronic control units.

In the case of a thermal engine which is designed to be of the bi-fuel type, it has been suggested to use a single common electronic control unit, which may electrically drive both groups of injectors by means of a switching device which receives as input the command signals from the common electronic control unit and outputs the electric driving signals to both groups of injectors, instead of using two separate, independent electronic control units. For example, the switching device may comprise a plurality of electromagnetic relays, each of which is adapted to electrically connect at least one corresponding injector to the common electronic control unit.

The use of a single common electronic control unit in combination with a switching device provided with electromechanical relays allows to reduce the costs of the fuel feeding system; however, the switching times of the switching device provided with electromechanical relays present a high dispersion with respect to the nominal value because in addition to depending on the manufacturing tolerances they are also heavily affected by the running temperature, the power voltage and the age of the component (i.e. the number of switches performed during the life of the component). Consequently, the common electronic control unit cannot estimate the real switching times with sufficient precision and therefore either a feed overlap (i.e. for a short time both fuels are concurrently supplied into the cylinders) which determines a torque peak or a feeding gap (i.e. for a short period no fuel is fed into the cylinders) which determines a torque gap may easily occur during the fuel changeover (i.e. during the passage from one fuel to the other). In both cases, an irregular operation of the thermal engine occurs with a random, pulsing variation of the engine speed (increase of engine speed in case of feeding overlap or decrease of the engine speed in case of feeding gap).

DISCLOSURE OF INVENTION

It is the object of the present invention to provide a control method of a fuel feeding system in a bi-fuel internal combustion engine, which control method is free from the above-described drawbacks, and specifically, is easy and cost-effective to make.

According to the present invention, a control method of a fuel feeding system in a bi-fuel internal combustion engine is provided as claimed in the attached claims.

BRIEF DESCRIPTION OF THE DRAWINGS

The present invention will now be described with reference to the accompanying drawings which illustrate a non-limitative example of embodiment thereof, in which.

PREFERRED EMBODIMENTS OF THE INVENTION

Figure 1:
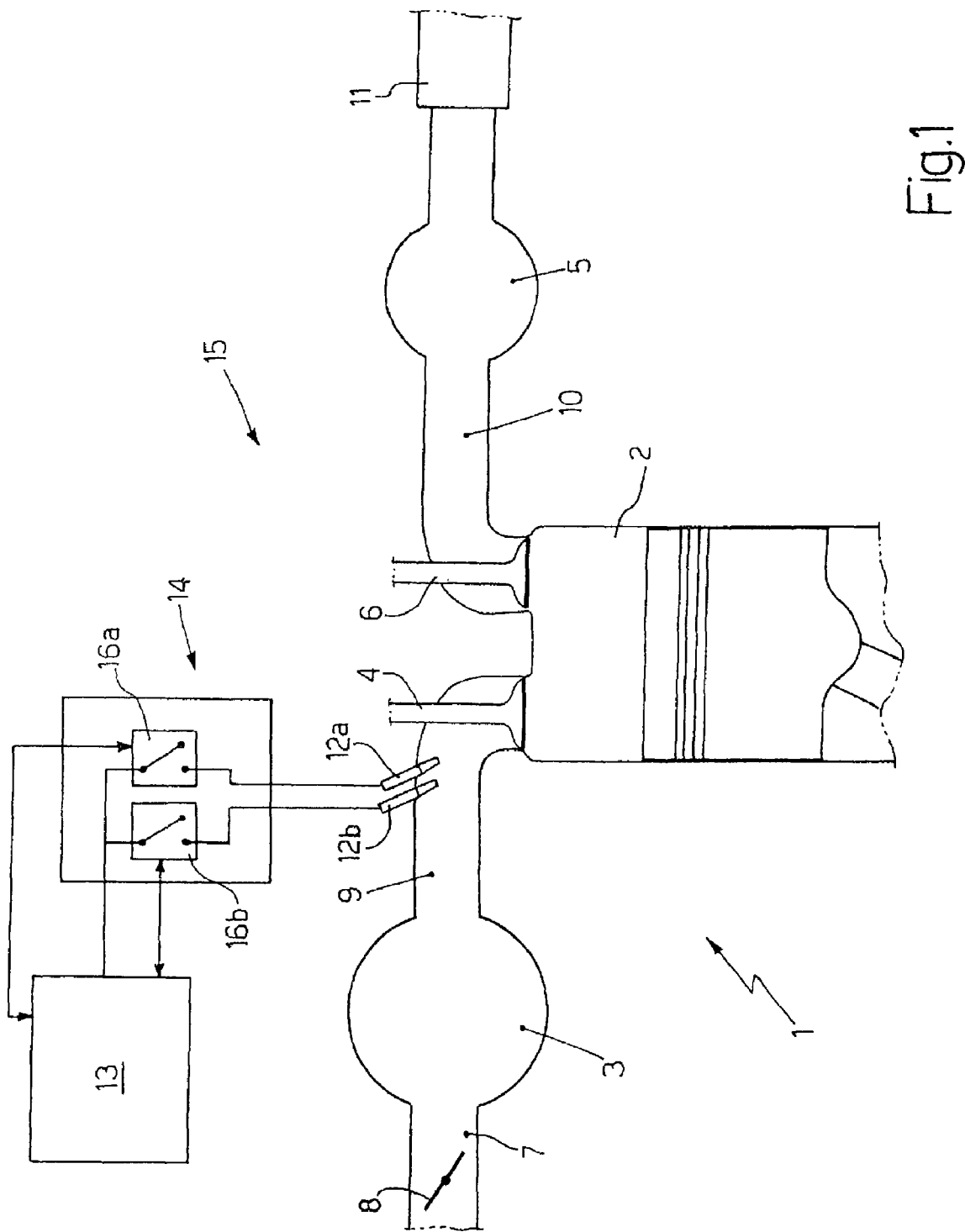
FIG. 1 is a diagrammatic view of a bi-fuel internal combustion thermal engine which implements the control method object of the present invention.

In FIG. 1, numeral 1 indicates as a whole an internal combustion thermal engine of the bi-fuel type, i.e. feedable with two different fuels (e.g. gasoline and LPG or gasoline and methane).

Internal combustion engine 1 is provided with a number of cylinders 2 (only one of which is shown in FIG. 1), each of which is connected to an intake manifold 3 by means of two intake valves 4 (only one of which is shown in FIG. 1) and to an exhaust manifold 5 by means of two exhaust valves 6 (only one of which is shown in FIG. 1).

Intake manifold 3 receives fresh air (i.e. air from the external environment) through a feeding pipe 7 regulated by a butterfly valve 8 and is connected to cylinders 2 by means of corresponding intake pipes 9 (only one of which is shown in FIG. 1), each of which is adjusted by corresponding intake valves 4. Similarly, exhaust manifold 5 is connected to cylinders 2 by means of corresponding exhaust pipes 11 (only one of which is shown in FIG. 1), each of which is adjusted by corresponding exhaust valves 6; an emission pipe 11, which ends with a muffler to release the gases produced by combustion into the atmosphere, departs from exhaust manifold 5.

Each cylinder 2 comprises a spark plug (not shown), which is arranged on the roof of cylinder 2 and is cyclically driven to ignite the mixture at the end of the compression step (i.e. at TDC—Top Dead Centre). In the embodiment shown in FIG. 1, two injectors 12a and 12b are contemplated, each of which is adapted to inject a corresponding fuel type inside each intake pipe 9 and near corresponding intake valves 4. According to a different embodiment (not shown), injectors 12 are arranged so as to directly inject the fuel into each cylinder 2.

A common electronic control unit 13 governs the operation of thermal engine 1. As shown in FIG. 1, common electronic control unit 13 is connected to injectors 12 by means of the interposition of a switching device 14. Specifically, switching device 14 is controlled by common electronic control unit 13 and is adapted to electrically connect all injectors 12 to common electronic control unit 13 by means of a relay 16a adapted to connect/disconnect injectors 12a to/from common electronic control unit 13 and by means of a relay 16b adapted to connect/disconnect electronic injectors 12b to/from common electronic control unit 13.

Injectors 12, common electronic control unit 13, and switching device 14 belong to a fuel feeding system 15 of thermal engine 1, which is indifferently capable of feeding either fuel types.

Figure 2:
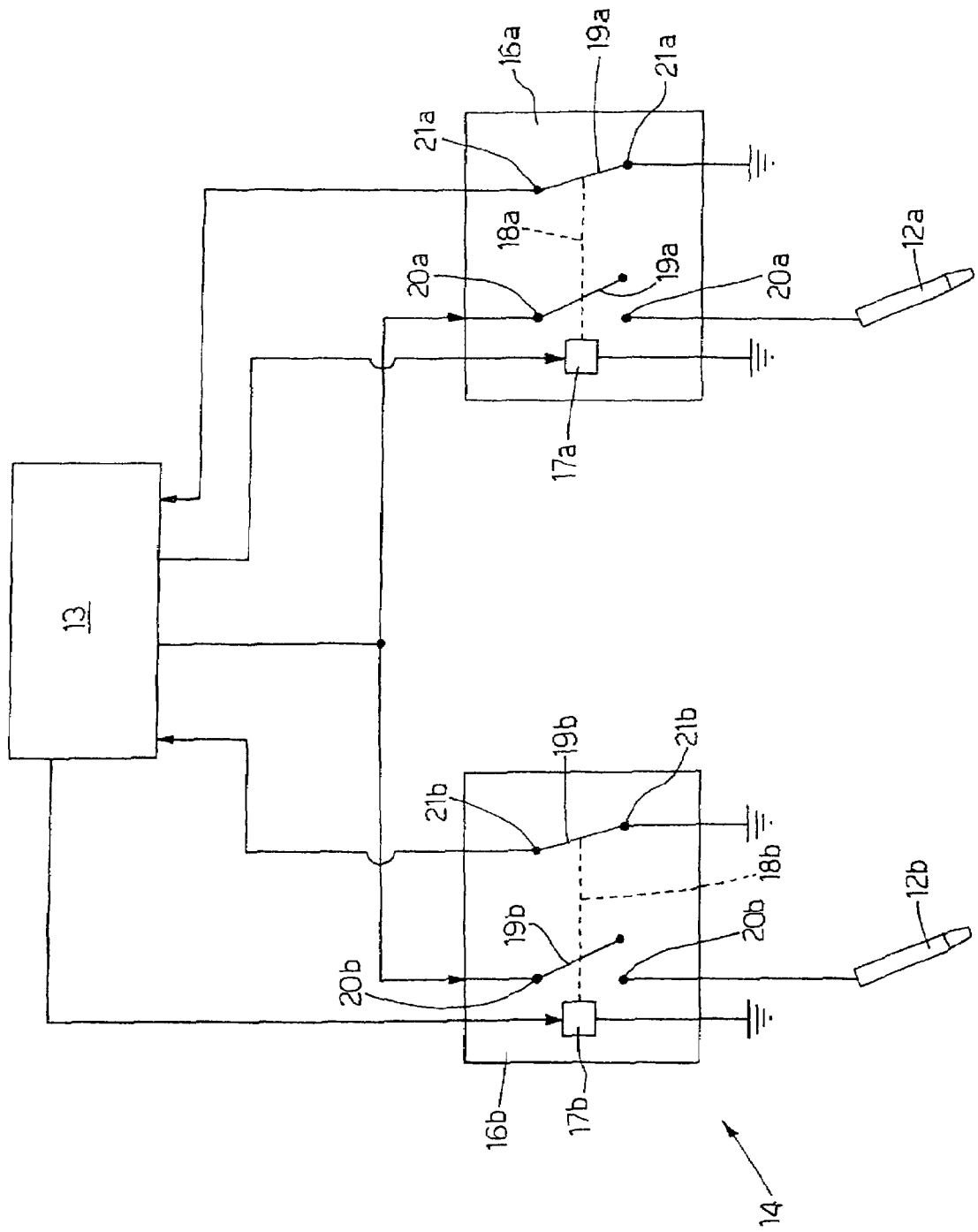
FIG. 2 is a simplified view of a wiring diagram of a fuel feeding system of the thermal engine in FIG. 1.

In the embodiment shown in FIG. 2, relays 16 are of the electromechanical type, i.e. each relay 16 comprises a control coil 17 which is energized to electromagnetically generate a force which physically displaces a mobile plunger 18 mechanically connected to a series of switches 19 (either normally open or normally closed) against the elastic bias generated by a foil (not shown) which tends to maintain the switches either in an open (normally open) or in a closed (normally closed) position. It is important to underline that the two relays 16 may be physically integrated in a single common container. According to a different embodiment (not shown), relays 16 are of the electronic type and thus do not comprise any mechanically mobile part.

As shown in FIG. 2, each relay 16 comprises four pairs of power terminals 20 (only one of which is shown in FIG. 2), which are adapted to connect corresponding injectors 12 to common electronic control unit 13, and at least one pair of auxiliary terminals 21 mechanically connected to power terminals 20 and at least one of which is connected to common electronic control unit 13. For example, in the embodiment shown in FIG. 2, in each relay 16, one auxiliary terminal 21 is connected to common electronic control unit 13, while the other auxiliary terminal 21 is connected to the electronic ground; in this manner, by detecting the voltage present on each auxiliary terminal 21 connected thereto, common electronic control unit 13 may detect the opening/closing state of corresponding relay 16.

It has been observed that the opening/closing times $t_o/t_c$ (i.e. the switching times) of each relay 16 present a high dispersion with respect to the nominal values because in addition to depending on the manufacturing tolerances they are also heavily affected by the working temperature, the power voltage, and the age of the component (i.e. the number of switches performed during the life of the component). Specifically, closing times $t_c$ (generally between 2 and 8 msec) are generally shorter than opening times $t_o$ (generally between 6 and 21 msec) and are those most subject to variations induced by external factors, mainly running temperature and energizing voltage. Other manufacturing features intrinsic to relays 16, such as for example the electric resistance of coil 17, the air gap size, and the elastic features of the foil, additionally affect the closing times of relays 16. The opening times of relays 16 are instead mainly related to the manufacturing features and present a low variability induced by external factors. Furthermore, the opening times of relays 16 are also subject to a variation during the life of relays 16, e.g. by effect of electric contact wear and of reduced flexibility of the foil; specifically, the opening times of relay 16 increase as the number of switches increases.

Common electronic control unit 13 controls relays 16 of switching device 14 in order to switch the fuel fed to thermal engine 1; specifically, common electronic control unit 13 closes relay 16a and opens relay 16b so as to drive injectors 12a and inject a first fuel type; instead, common electronic control unit 13 opens relay 16a and closes relay 16b so as to drive injectors 12b and inject a second fuel type.

In order to account for the variability of the opening/closing times of relays 16, the real opening time and the real closing time of both relays 16 are stored in a non-volatile memory of common electronic control unit 13. When common electronic control unit 13 is new, such real opening/closing times are initially assumed as equal to the average expected values resulting from experimental tests performed on relays 16; the real opening/closing times are cyclically updated later during the life of common electronic control unit 13. The updating of the previously determined real opening/closing times (i.e. historical and stored in the non-volatile memory of common electronic control unit 13) of a relay 16 contemplates measuring the opening/closing times during a switching performed by relay 16 and then updating the previously determined real opening/closing times using the new measurements by means of a weighed average (obviously, the previously determined real opening/closing times have a higher weight than the new measurement).

The real opening/closing time $t_o/t_c$ of a relay 16 is determined by detecting the instant in which the opening/closing command is sent to relay 16 and detecting the instant in which a change of state occurs in auxiliary terminals 21 (i.e. the instant in which the state of relay 16 actually switches). In relation to the above, real closing time $t_c$ of each relay 16 is determined according to the running temperature (i.e. the temperature of the coolant liquid of thermal engine 1 and/or the external temperature) and to the power voltage (i.e. to the voltage at the terminals of the battery of thermal engine 1). Instead, the real opening time $t_o$ of each relay 16 is not parameterized according to external functions.

Figure 3:
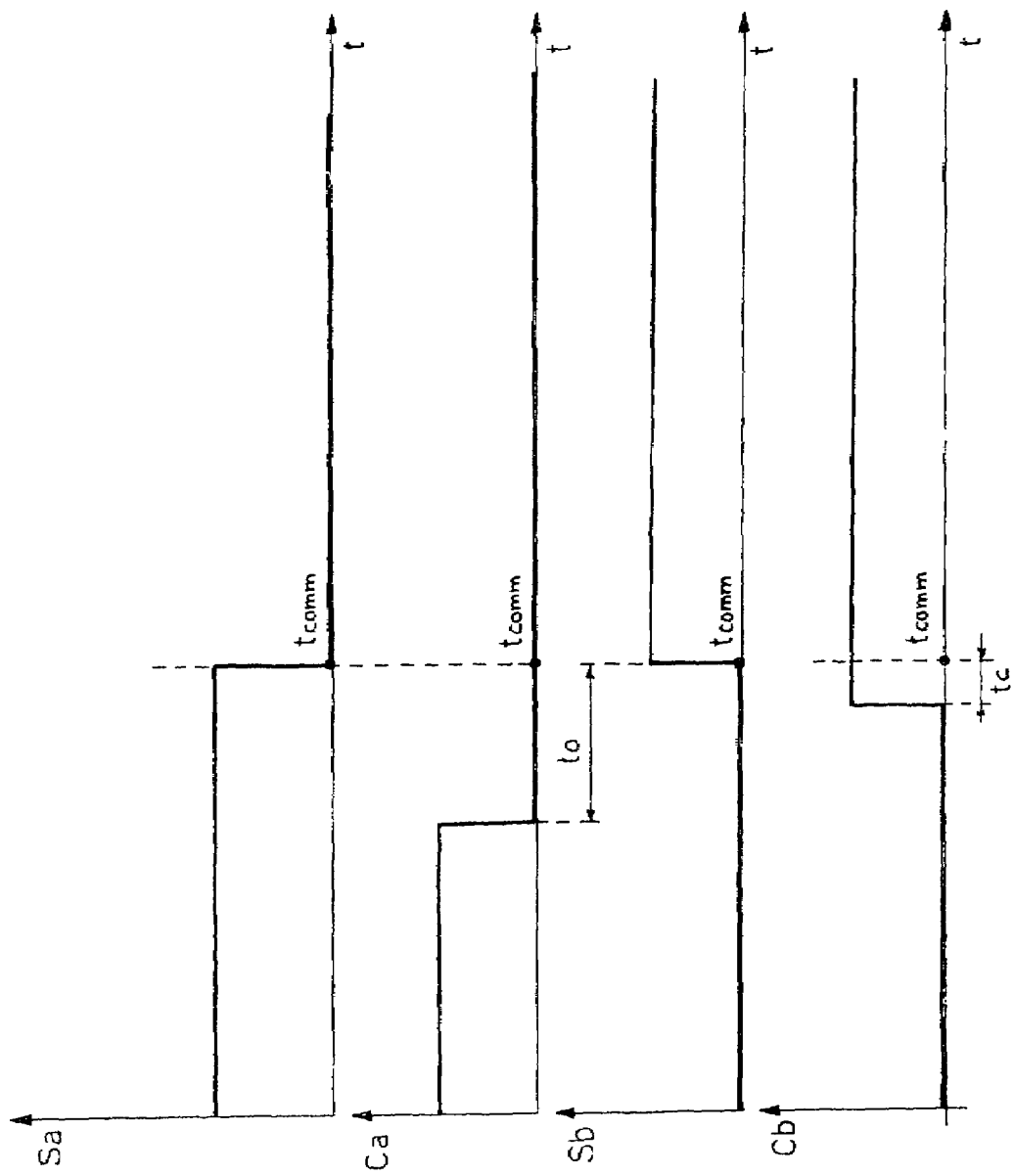
FIG. 3 shows some charts which depict the evolution of some control quantities of the fuel feeding system in FIG. 2 in time.

As shown in the charts in FIG. 3, in order to change the fuel which is fed to thermal engine 1, common electronic control unit 13 determines a desired switching instant $t_c$ (i.e. an instant in which the switchover of the two fuels must occur), sends the closing command of relay 16a or 16b in advance with respect to the desired switching instant $t_{comm}$ according to real closing time $t_c$ of relay 16a or 16b itself, and sends the opening command of relay 16b or 16a in advance with respect to the desired switching instant $t_{comm}$ according to real opening time $t_o$ of relay 16b or 16a itself. Specifically, the closing command of a relay 16 is sent in advance with respect to the desired switching instant $t_{comm}$ equal to real closing time $t_c$ of relay 16 itself; furthermore, the opening command of a relay 16 is sent in advance with respect to the desired switching instant $t_{comm}$ thus equalising the real opening time $t_o$ of relay 16 itself.

Specifically, the charts in FIG. 3 show:

state $S_a$ of relay 16a according to time—state $S_a$ of relay 16a goes from open to closed in the desired switching instant $t_{comm}$;

state $C_a$ of the command signal of relay 16a generated by common electronic control unit 13 according to time—state $C_a$ of the command signal of relay 16a is changed in advance with respect to the desired switching instant $t_{comm}$ thus equalising the real closing time $t_c$ of relay 16a;

state $S_b$ of relay 16b according to time—state $S_b$ of relay 16b goes from closed to open in the desired switching instant $t_{comm}$;

state $C_b$ of the command signal of relay 16b generated by common electronic control unit 13 according to time—state $C_b$ of the command signal of relay 16b is changed in advance with respect to the desired switching instant $t_{comm}$ thus equalising the real opening time $t_a$ of relay 16b.

By proceeding as described above, the real switching of both relays 16 occurs at switching instant $t_{comm}$; in this manner, a feed overlap (i.e. for a short time both fuels are concurrently fed into cylinders 2) which determines a torque peak and a feeding gap (i.e. for a short period no fuel is fed into cylinders 2) which determines a torque gap are both avoided. Obviously, if the engine control so requires, a feed overlap or, more rarely, a feeding gap, may be voluntarily performed in certain situations; for example, a feed overlap may be performed for short times for obtaining a particularly high generation of motive torque with an effect similar to that of an overboost.

In other words, being certain about the instant in which relay 16 switches, common electronic control unit 13 may correctly modify the injection times, because generally the two fuels require two different injection times the engine position being equal.

According to a preferred embodiment, common electronic control unit 13 uses the signal read on auxiliary terminals 21 of each relay 16 also to verify the correct operation of relay 16 itself; in other words, if relay 16 does not switch within a given time interval once the switching command has been sent, then common electronic control unit 13 outputs a "stuck" or "jammed" diagnosis of relay 16.

The above-described feeding system presents numerous advantages, because it is simple and cost-effective to make and above all because it allows to make each relay switch exactly in the required instant with an extremely low error margin; in this manner, the fuel switchover occurs smoothly during the operation of thermal engine 1 and is thus not perceived by the driver. Furthermore, as manufacturing tolerances and deviations may be compensated in time, relays 16 of lower quality (and thus lower cost) which present a higher dispersion of performances with respect to nominal values may be used.

The invention claimed is:

1. A control method of a fuel feeding system (15) in a bi-fuel internal combustion engine (1); the feeding system (15) comprises:
   a least a first injector (12a) adapted to inject a first fuel type;
   a least a second injector (12b) adapted to inject a second fuel type;
   a common electronic control unit (13) adapted to drive both injectors (12); and
   a switching device (14), which is controlled by the common electronic control unit (13) and is adapted to electrically connect both injectors (12) to the common electronic control unit (13) by means of at least a first relay (16a) adapted to connect/disconnect the first injector (12a) to/from the common electronic control unit (13) and by means of at least a second relay (16b) adapted to connect/disconnect the second injector (12b) to/from the common electronic control unit (13);
   the control method comprises:
   closing the first relay (16a) and opening the second relay (16b) for driving the first injector (12a) and injecting the first fuel type;
   opening the first relay (16a) and closing the second relay (16b) for driving the second injector (12b) and injecting the second fuel type;
   determining the real opening time ($t_o$) and the real closing time ($t_c$) of both relays (16);
   determining a desired switching instant ($t_{comm}$);
   sending the closing command of a relay (16) in advance with respect to the desired switching instant ($t_{comm}$) according to the real closing time ($t_c$) of the relay itself (16); and
   sending the opening command of a relay (16) in advance with respect to the desired switching instant ($t_{comm}$) according to the real opening time ($t_c$) of the relay itself (16).

2. A control method according to claim 1, wherein the closing command of a relay (16) is sent in advance with respect to the desired switching instant ($t_{comm}$) thus equalising the real closing time ($t_c$) of the relay (16) itself and the opening command of a relay (16) is sent in advance with respect to the desired switching instant ($t_{comm}$) thus equalising the real opening time ($t_o$) of the relay (16) itself.

3. A control method according to claim 1, wherein each relay (16) presents at least one pair of power terminals (20), which are adapted to connect an injector to the common electronic control unit (13), and at least one pair of auxiliary terminals (21) mechanically connected to the power terminals (20) and at least one of which is connected to the common electronic control unit (13).

4. A control method according to claim 3, wherein the real opening/closing time ($t_o/t_c$) of a relay (16) is determined by detecting the instant in which the opening/closing command is sent to the relay (16) and by detecting the instant in which a change of state occurs in the auxiliary terminals (21).

5. A control method according to claim 1, wherein the real closing time ($t_c$) of each relay (16) is determined according to the running temperature.

6. A control method according to claim 1, wherein the real closing time ($t_c$) of each relay (16) is determined according to the power voltage.

7. A control method according to claim 1, wherein the real opening time ($t_a$) of each relay (16) is not parameterized according to external factors.

8. A control method according to claim 1, wherein the real opening/closing times ($t_o/t_c$) of each relay (16) are cyclically updated during the life of the relay (16) itself.

9. A control method according to claim 8, wherein the previously determined real opening/closing times ($t_o/t_c$) of each relay (16) are updated using a new measurement by means of a weighed average.

10. A control method according to claim 8, wherein the real opening/closing times ($t_o/t_c$) are initially assumed as equal to expected mean values resulting from experimental tests performed on the relays (16).

* * * * *